United States Patent
Kuhne et al.

(10) Patent No.: US 10,122,051 B2
(45) Date of Patent: Nov. 6, 2018

(54) ELECTROCHEMICAL STORAGE DEVICE HAVING A STATE DETECTOR

(71) Applicant: Siemens Aktiengesellschaft, Munich (DE)

(72) Inventors: Michael Kuhne, Furth (DE); Carsten Schuh, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 149 days.

(21) Appl. No.: 14/898,132

(22) PCT Filed: Mar. 5, 2014

(86) PCT No.: PCT/EP2014/054271
§ 371 (c)(1),
(2) Date: Dec. 13, 2015

(87) PCT Pub. No.: WO2014/202242
PCT Pub. Date: Dec. 24, 2014

(65) Prior Publication Data
US 2016/0141732 A1    May 19, 2016

(30) Foreign Application Priority Data
Jun. 17, 2013  (EP) .................................. 13172260

(51) Int. Cl.
*H01M 10/48* (2006.01)
*H01M 2/02* (2006.01)
(Continued)

(52) U.S. Cl.
CPC ........ *H01M 10/484* (2013.01); *G01F 23/296* (2013.01); *H01M 2/0265* (2013.01); *H01M 10/399* (2013.01); *H01M 10/48* (2013.01)

(58) Field of Classification Search
CPC combination set(s) only.
See application file for complete search history.

(56) References Cited

U.S. PATENT DOCUMENTS

| 3,985,576 | A | * | 10/1976 | Lingscheit | ........ | H01M 10/3909 403/179 |
| 4,442,700 | A | * | 4/1984 | Swoboda | ................. | G01N 9/24 73/32 A |

(Continued)

FOREIGN PATENT DOCUMENTS

| DE | 4229735 A1 | 3/1994 |
| DE | 102008043193 A1 | 4/2010 |

(Continued)

OTHER PUBLICATIONS

CN Office Action dated Jan. 18, 2017, for CN patent application No. 201480034423.3.

*Primary Examiner* — Kaity V Chandler
(74) *Attorney, Agent, or Firm* — Beusse Wolter Sanks & Maire

(57) ABSTRACT

An electrochemical storage device including a state detector, has an electrochemical storage device, which has a wall that surrounds an electrochemical storage material. The state detector has at least one ultrasonic transmitter and at least one ultrasonic receiver, which are attached to the side of the wall facing away from the electrochemical storage material. The electrochemical storage material is subject to a volume change during operation of the storage device, and the electrochemical storage material is liquid during operation of the storage device and is in direct contact with the wall and the ultrasonic transmitter and the ultrasonic receiver are attached to the wall in such a way that the ultrasonic transmitter and the ultrasonic receiver are acoustically coupled to the wall.

20 Claims, 2 Drawing Sheets

(51) Int. Cl.
*G01F 23/296* (2006.01)
*H01M 10/39* (2006.01)

(56) References Cited

U.S. PATENT DOCUMENTS

| | | | | |
|---|---|---|---|---|
| 4,610,164 | A * | 9/1986 | Sobue | G01F 23/2965 340/621 |
| 5,438,868 | A * | 8/1995 | Holden | G01F 23/296 342/124 |
| 7,615,954 | B1 * | 11/2009 | Potter | G01F 23/296 318/291 |
| 9,548,520 | B2 * | 1/2017 | Deveau | H01M 10/484 |
| 2008/0020493 | A1 * | 1/2008 | Jin | G01F 23/296 438/5 |
| 2011/0050235 | A1 | 3/2011 | Bogdan, Jr. et al. | |
| 2011/0236749 | A1 | 9/2011 | Sarrafi-Nour et al. | |
| 2013/0132005 | A1 * | 5/2013 | Welle | G01F 23/284 702/55 |
| 2014/0334983 | A1 * | 11/2014 | Yang | F01N 11/00 422/119 |
| 2015/0177045 | A1 * | 6/2015 | Cobianu | G01F 23/2968 367/99 |
| 2016/0169839 | A1 * | 6/2016 | Gottlieb | G01N 29/02 367/7 |

FOREIGN PATENT DOCUMENTS

| | | | |
|---|---|---|---|
| GB | 2270754 A | | 3/1994 |
| JP | 2000205931 A | | 7/2000 |
| JP | 2001176544 A | | 6/2001 |
| WO | WO 9302340 | * | 2/1993 |

* cited by examiner

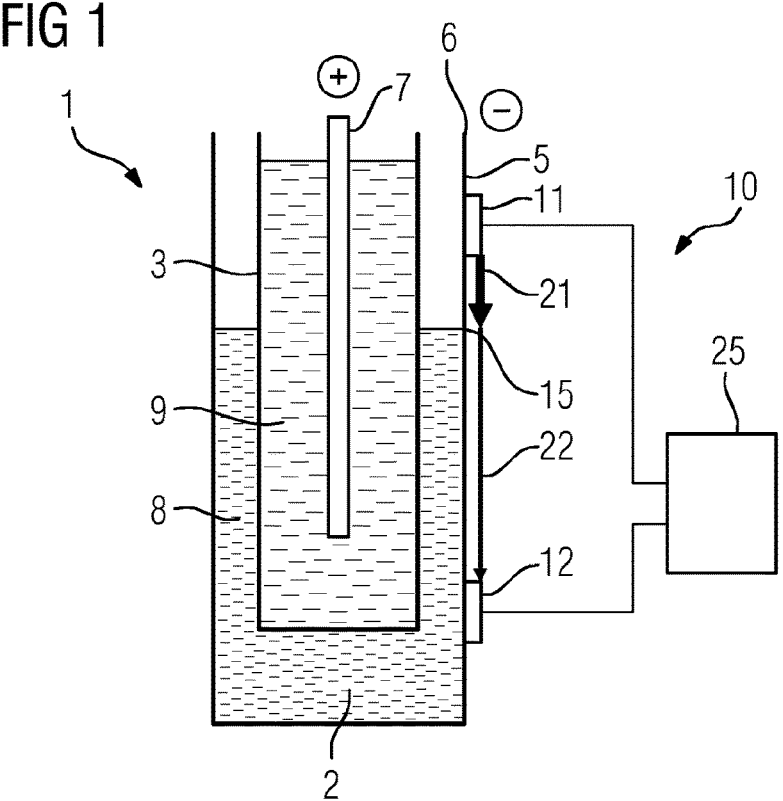
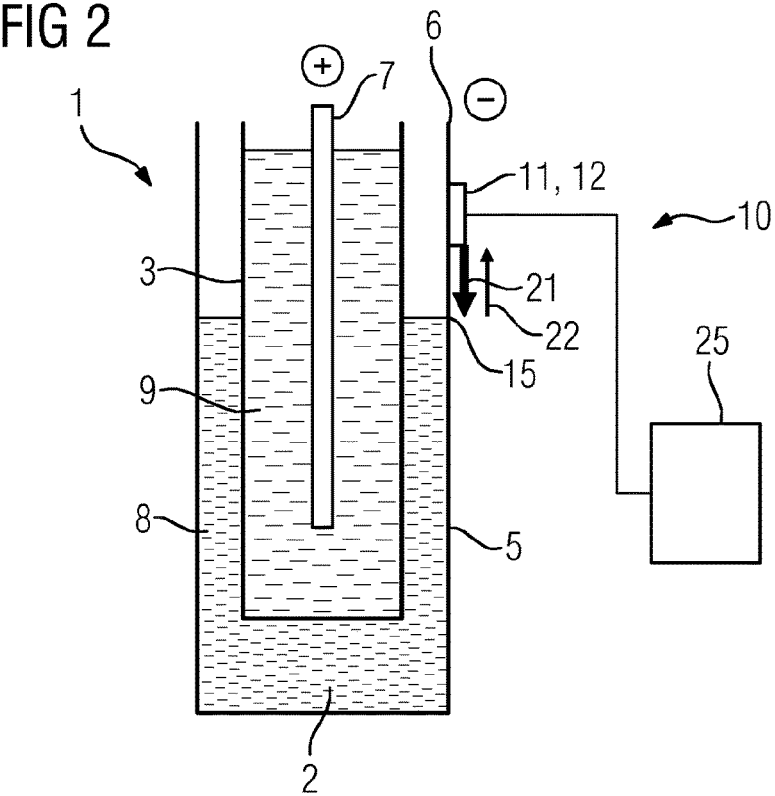

ELECTROCHEMICAL STORAGE DEVICE HAVING A STATE DETECTOR

CROSS REFERENCE TO RELATED APPLICATIONS

This application is the US National Stage of International Application No. PCT/EP2014/054271 filed Mar. 5, 2014, and claims the benefit thereof. The International Application claims the benefit of European Application No. EP13172260 filed Jun. 17, 2013. All of the applications are incorporated by reference herein in their entirety.

FIELD OF INVENTION

The present invention relates to an electrochemical storage device having a state detector and a method for operating such an electrochemical storage device.

BACKGROUND OF INVENTION

Because of numerous advantageous functional properties, for example, the high energy densities and industrially relevant current densities during charging and also discharging procedures, electrochemical storage devices, including in particular metal-metal halogenide and sodium-sulfur storage batteries, are increasingly also being used in large-scale industrial applications. To monitor the service life of such an electrochemical storage device and to lengthen it by way of maintenance measures, it is advantageous to detect the charge or discharge state of the electrochemical storage device safely and reliably.

In the cell design known from the prior art, for example, of the electrochemical storage device based on the technology of the sodium-nickel chloride cell, the anode or negative electrode has, at operating temperatures, liquid metal, especially sodium, as the electrochemical storage material. The fill level of the liquid metal changes as a result of the charging or discharging procedures in this storage device. With increasing charge of this storage device based on the technology of the sodium-nickel chloride cell, the sodium fill level rises in an anode chamber interconnected with the anode of the storage device, whereby changes of the electrical and also electrochemical parameters result (for example, a change of the charge curve). A comparable change also takes place upon increasing discharge of the storage device, wherein the sodium fill level then sinks accordingly. The difference of the fill levels can be up to 10 cm or more between a fully charged storage device, which is based on the technology of the sodium-nickel chloride cell, and a completely discharged storage device.

It has thus proven to be technically advantageous to predict the state of such an electrochemical storage device, in particular the charge or discharge state of such an electrochemical storage device, with sufficient reliability and in a controlled manner. A method for direct measurement of the fill level in a sodium-nickel chloride storage device is described, for example, in the patent application US 2011/0050235. It is proposed therein that, by means of two metal feelers, which are introduced from above into a storage device, the electrical short-circuit be detected when both feelers are short-circuited by contact with the liquid metal. However, the complex mechanical integration of these measuring feelers in the storage device is disadvantageous in such a solution, which in particular requires difficult sealing measures. In addition, retrofitting already manufactured storage devices is hardly possible. Moreover, in such a solution, only the binary information can be ascertained as to whether the present fill level is above or below the position of the contact pins; intermediate values of the fill level cannot be determined directly according to the prior art.

A further method for measuring the fill level in a high-temperature battery is described in DE 10 2008 043 193 A1. According to this teaching, the fill level can be ascertained by means of a metallic resistance strip arranged in the battery.

A further alternative solution is described in US 2011/0236749 A1, in which the fill level is to be ascertained by means of communicating pipes. This solution still has the disadvantage of the high technical expenditure, however, which is required for a state detection in the electrochemical storage device. In addition, the solution again does not permit retrofitting of existing cells using a technology which could enable the state detection.

A further technical solution is specified in DE 42 29 735 A1, according to which the state of an acid chamber, in particular of a lead acid battery, can be ascertained by means of an ultrasonic wave generator and an ultrasonic wave receiving device. According to the device described therein, ultrasonic waves are emitted into the interior of the battery, to propagate in the acid chamber. Reflected components are recorded by the ultrasonic wave receiving device and analyzed, whereby inferences can be obtained about the acid state. The ultrasonic wave generator and the ultrasonic wave receiving device are placed for this purpose on an opening of the battery, which also forms the emission channel or detection channel.

However, it has proven to be disadvantageous for such a state detection that an open connection has to exist between acid chamber and ultrasonic wave generator or ultrasonic wave receiving device. For this purpose, it is not only necessary to firstly open the battery chamber, in order to attach the ultrasonic wave generator and the ultrasonic wave receiving device, but rather also to seal them in relation to the surroundings. In particular in the case of reactive substances in the battery chamber, an undesired escape of battery liquid can thus easily occur.

In addition, such a device is not suitable for use in conjunction with high-temperature batteries, in which the formation of leaks is a concern because of the thermal variations during operation. Furthermore, such a device has proven to be unfavorable during maintenance work on the ultrasonic wave generator or the ultrasonic wave receiving device, since they always have to be removed from the battery housing, and thus expose the battery chamber.

It has thus proven to be technically desirable to avoid these disadvantages known from the prior art. In addition, it is technically desirable to execute such a state detection independently of the ambient medium into which the electrochemical storage device is introduced, with sufficient reliability and accuracy. It is to be taken into consideration in this case that electrochemical storage devices, for example, the sodium-nickel chloride cell or the sodium-sulfur cell, can only be operated at high temperatures from time to time, for example, of greater than 250° C., in particular even of greater than 350° C. Furthermore, it is technically desirable to propose a technology which is able to detect rapidly and is also simultaneously usable for numerous individual electrochemical storage devices, without a space-saving interconnection of these storage devices coming into consideration. Furthermore, it is desirable, in particular when interconnecting many electrochemical storage devices to form larger modules, to query individual states, in particular the charge or discharge state, of a storage device continuously and in a targeted manner. Moreover, such a technology is to be robust and cost-effective. The resulting maintenance expenditure for such a technology is also to be low or the technology is to be maintenance-free.

SUMMARY OF INVENTION

These objects on which the invention is based are achieved by an electrochemical storage device as claimed and by a method for operating such a storage device, as described above and also hereafter, as claimed.

In particular, these objects on which aspects of the invention are based are achieved by an electrochemical storage device having state detectors, comprising an electrochemical storage device, which has a wall enclosing an electrochemical storage material, wherein the state detector has at least one ultrasound emitter and at least one ultrasound receiver, which are attached on the side of the wall facing away from the electrochemical storage material, and wherein the electrochemical storage material is subject to a volume change during operation of the storage device, wherein the electrochemical storage material is provided in liquid form and is in direct contact with the wall during operation of the storage device, and the ultrasound emitter and the ultrasound receiver are attached on the wall such that they are acoustically coupled to the wall.

Furthermore, the objects on which aspects of the invention are based are achieved by a method for operating such an electrochemical storage device, also as described hereafter, comprising the following steps:—output of an emission signal by the ultrasound emitter;—reception of a response signal by the ultrasound receiver;—analysis of the response signal using an analysis circuit to ascertain a state of the electrochemical storage material, in particular the fill level of the electrochemical storage material.

It is to be noted at this point that here and hereafter, an electrochemical storage device is to be understood to mean that it enables electrical energy to be converted by an electrochemical reaction and this energy, or a part thereof, to be buffered in chemical form. When the energy is discharged, an electrochemical storage material is reacted, wherein electrical energy (in the meaning of charge current*voltage) again becomes free, which can accordingly be supplied to further use. In addition, in parallel to a material reaction in the anode chamber, an electrochemically equivalent quantity of cathode material is always reacted in the cathode chamber. However, since the quantities are equivalent, it is entirely sufficient to only observe one side of the electrochemical cell, i.e., for example, the anode side.

According to aspects of the invention it is necessary for the wall to enclose the electrochemical storage material. This can be a complete or also a partial enclosure of the electrochemical storage material. It is thus not necessary for the wall to be completely occupied or wetted on one side by electrochemical storage material. This is also already not possible, insofaras, as a result of the state change in the electrochemical storage device in particular, a volume change of the electrochemical storage material takes place.

Furthermore, it is to be noted that the operation of the electrochemical storage device according to the invention is to comprise all operating modes, in particular, desired electrochemical reactions are to run during these operating modes. These are above all charging operation and also discharging operation, wherein standby operation (storage operation) can also be a suitable operating state.

According to one particular embodiment of the invention, it is provided that the state detector is applied directly to the wall of the electrochemical storage device. The arrangement of ultrasound emitter and ultrasound receiver in this case is in particular such that they are connectable via a plug which is linear in at least one direction and is located on the wall. For this purpose, the wall, for example, is formed such that a linear section or a planar surface section of the wall is provided. In this way, linear and therefore controlled and direct sound conduction is very possible.

According to the embodiment, it can also be provided that the wall is also comprised by a cell housing of the storage device, or is this cell housing.

The volume change of the electrochemical storage material relates in particular to a fill level change, since the storage device is filled with more or less electrochemical storage material depending on the charge state or discharge state. The operation of the storage device increases the volume of the electrochemical storage material (for example, during charging) or reduces the volume (for example, during discharging). The volume change thus does not result solely from a purely thermal volume change of the electrochemical storage material, but rather requires the increase or decrease in quantity of electrochemical storage material as a result of electrochemical reactions.

According to aspects of the invention, it is thus provided that an electrochemical storage device is provided with a state detector, which enables a state detection, in particular a fill level detection, by means of ultrasound emitter and ultrasound receiver. The ultrasound emitter and the ultrasound receiver are attached to the wall enclosing the electrochemical storage material and are therefore acoustically coupled to this wall. Opening the wall to attach the state detector is therefore not necessary. Upon output of an emission signal of the ultrasound emitter, the sound is conducted along the wall in the direction toward the ultrasound receiver. In this case, the emission signals emitted by the ultrasound emitter can propagate as acoustic waves in or on the material of the wall. If the emission signal encounters a density difference during this propagation, a part of these waves is scattered, absorbed, and/or reflected. Depending on the positional arrangement of the ultrasound receiver in relation to the ultrasound emitter, either the damping or phase shift of the emission signal can be detected by the ultrasound receiver, or the scattered or reflected waves are detected as a response signal by the ultrasound receiver, and analyzed by means of a suitable analysis circuit.

Since the ultrasound emitter and also the ultrasound receiver are attached on the wall enclosing the electrochemical storage material, depending on the volume change of the electrochemical storage material, i.e., for example, depending on the fill level of the electrochemical storage material, the acoustic waves are influenced earlier or later by the fill level. Inferences about the location of the influence, and therefore about the fill level height or boundary of the electrochemical storage material, can be made from the time curve or the damping or also from the phase shift of these influenced surface waves in comparison to the originally emitted emission signal of the ultrasound emitter.

The technical solution according to the invention thus enables a substantially continuous, high-precision, and robust real-time measurement of the state of the electrochemical storage device. In particular, the volume, in particular the fill level of the electrochemical storage material is accurately detected. Furthermore, no state detectors are required in the anode chamber or cathode chamber of the electrochemical storage device, whereby the arrangement is distinguished by a high level of simplicity and therefore a lengthened service life. The state detector can additionally be applied to the outer wall of a cell, that is, the cell housing, for example. Separate communicating measurement cells, as are known from the prior art, thus do not have to be fluidically connected. Furthermore, such an electrochemical storage device can be used in numerous ambient media, for example, in air or also in liquid media such as thermal oil, whereby suitable cooling or suitable heat management of this electrochemical storage device can be enabled.

Because of the comparatively low acoustic deflection amplitudes of the emission signal of the ultrasound emitter and also of the response signals for the ultrasound receiver, the components of the electrochemical storage device, such as electrolyte or electrode layers, weld seams, and seals are not subjected to high mechanical loads, whereby damage is substantially precluded.

In addition to the fill level detection of the electrochemical storage material, which is comprised by the electrochemical storage device, a temperature ascertainment can also be performed simultaneously, since a thermal expansion of the material of the wall occurs in the event of increasing temperature, which can in turn be detected metrologically with the aid of the ultrasound emitter and ultrasound receiver. As a result, multiple operationally-relevant variables can be detected by the invention. This increases the flexibility of the electrochemical storage device.

According to aspects of the invention, it is additionally provided that the electrochemical storage material is provided in liquid form and is in direct contact with the wall during operation of the storage device. The electrochemical storage material is advantageously provided in the anode chamber in this case. Direct contact between electrochemical storage material and wall promotes the detection principle, which requires influencing of the emission signal emitted by the ultrasound emitter. Because of the direct mechanical coupling between wall and electrochemical storage material, sufficiently good acoustic coupling is also ensured. If the electrochemical storage material is additionally provided in liquid form, the location of the influence of the emission signal can be detected particularly accurately, since a phase boundary which is very detectable is provided.

Typical operating temperatures of an electrochemical storage device claimed according to the embodiment are approximately 200° C. or more. An advantageous upper temperature limit can be approximately 500° C. Such high operating temperatures ensure that the electrochemical storage material, in particular in storage devices which are based on the technology of the sodium-nickel chloride cells and the sodium-sulfur cells, is provided in liquid form. The detection of the fill level at such temperatures is particularly advantageous, since a clearly detectable phase boundary exists.

According to one particularly advantageous embodiment of the invention, it is provided that the electrochemical storage material is a metal, the melting point of which is in particular not greater than 150° C. The electrochemical storage material is advantageously provided in the anode chamber in this case. The melting point is also advantageously greater than 0° C. In particular, the metal is sodium, which has a melting point in standard conditions of 97.72° C. Metal is a particularly good acoustic conductor, so that phase boundaries in metal may be detected particularly well by means of acoustic ultrasound signals. The good sound conduction properties of metal relate to metal both in solid and also in liquid phase.

According to a further embodiment of the invention, it is provided that the wall is a metal, in particular a metal alloy, the melting point of which is greater than 800° C. The metal is in particular a nickel-based alloy, or a steel or a steel alloy. Such metals also enable the operation of the electrochemical storage device at high temperatures, wherein good sound conduction properties are also ensured at these temperatures. Furthermore, such a metal, in particular a nickel-based alloy, or a steel or a steel alloy, has proven to be less corrosive upon use in conjunction with strongly corrosive electrochemical storage materials, such as sodium in a storage device based on the sodium-nickel chloride cell. Metal additionally has a sufficiently smooth surface, or such a surface can be provided by suitable processing methods, via which particularly good decoupling of acoustic waves can take place. In addition, such a metal or a nickel-based alloy or a steel or a steel alloy can be made sufficiently thin, so that during sound conduction in the material, good influencing of the sound conduction properties can be achieved by materials mechanically connected to this material.

According to a further particularly advantageous aspect of the invention, it is provided that during operation of the storage device, the volume change of the electrochemical storage material in the case of complete charge of the storage device defines a first fill level, and the ultrasound emitter or the ultrasound receiver is attached at a first location of the wall, the corresponding region of which on the opposite side of the wall is still located above this fill level (above this fill level height). In this case, it is to be assumed that the storage device is operated as intended and a fill level may be set reproducibly during this operation. The storage devices are typically not moved further during operation, so that a fill level can be detected in a controlled and reproducible manner. Furthermore, some storage devices have a geometry which makes it necessary to arrange the storage device in a predefined alignment in relation to the Earth's gravitational field (for example, in the case of the sodium-nickel chloride cell, the electrochemical storage material of which, sodium, is arranged at the bottom, i.e., closer to the Earth's core, during operation of the cell). Such an alignment required by the geometry also corresponds in this case to appropriate alignment and permits, for example, in the case of a sodium-nickel chloride storage device, the fill level of the liquid sodium to be determined reproducibly. A location above the fill level indicates that the relevant region of the opposite side of the wall is not covered by the electrochemical storage material, or is not located at a comparable height. As a result of this arrangement of ultrasound emitter or ultrasound receiver, the fill level of the electrochemical storage device can be detected for all charge or discharge states. This enables a detection which is suitable over all charge states.

According to a further particularly advantageous embodiment of the invention, it is provided that during operation of the storage device, the volume change of the electrochemical storage material in the case of complete operational discharge of the storage device defines a second fill level, and the ultrasound emitter or the ultrasound receiver is attached at a second location of the wall, the corresponding region of which on the opposite side of the wall is still located below the fill level (or below the fill level height). In this case, it is again to be assumed that the storage device is appropriately operated or an alignment in relation to the Earth's gravitational field predefined because of the geometry is provided. A location below the fill level indicates in this case that the relevant region of the opposite side of the wall is still covered by the electrochemical storage material or is located below a comparable height even when the storage device has already been completely discharged. A complete discharge is provided above all if the storage device has been completely discharged by a discharging procedure starting from a previous charge state (in the case of the sodium-nickel chloride cell, a state in which no emission of electrical energy is provided also exists at the point in time of an initial charge. However, this initial state is not also to be included in the present case when reference is made to a complete discharge). This embodiment again enables the complete detection of all fill levels of the possible charge or discharge states of the electrochemical storage device.

According to a further very advantageous embodiment of the invention, it is provided that the state detector has an ultrasound emitter, which also operates as an ultrasound receiver. Both, ultrasound emitter and ultrasound receiver, can thus be integrated in one component. On the one hand, this reduces the component expenditure, in addition, the ultrasound emitter or ultrasound receiver can also be attached in a region of the wall which does not have to be in contact with electrochemical storage material, on the side of the wall opposite to the ultrasound emitter or ultrasound receiver. If ultrasound emitter and ultrasound receiver are integrated in one component, they can be clocked in chronological alternation, for example, i.e., operate once as an ultrasound emitter and once as an ultrasound receiver.

Furthermore, it can be provided that the state detector is designed to be operated in chirp operation. In such chirp operation, the signal emission by the ultrasound emitter is performed with a signal modulation over a predetermined frequency range, whereby the location resolution after reception and analysis of the response signal can be significantly increased still further in comparison to operation using a monofrequent emission signal. After reception of the response signal, in particular a frequency analysis can be performed, which has a significantly higher information content in comparison to an analysis of a solely monofrequent emission signal.

Furthermore, it is provided that the state detector has an ultrasound emitter and/or an ultrasound receiver which is designed as a piezoelectric component. Such piezoelectric components enable the simple generation of a high-frequency, high-energy sound field having a directional characteristic, whereby the acoustic signals can in particular be emitted in one direction or received from one direction. This in turn increases the accuracy of the state detection.

According to a further embodiment of the invention, it is provided that the electrochemical storage device is designed as a metal-metal halogenide storage device. These storage devices are especially designed as a sodium-nickel chloride storage device. These storage devices have liquid sodium as the electrochemical storage material at operating temperatures, the fill level of which can be detected particularly well, since it has particularly good sound conduction properties as a metal.

According to a further embodiment of the method, it is provided that the emission signal has a plurality of different ultrasonic frequencies, and in particular is designed as a ramp over a predetermined frequency range. Suitable frequency ranges for this purpose are, as in general for all nondestructive ultrasonic detection, between 10 kHz and 1 GHz. In this case, only a small window of this frequency range is traversed in the case of a ramp operation. A ramp has a pulse duration of approximately 10 μs, for example, wherein 1 millisecond to 10 seconds can be selected as a suitable pulse interval. The plurality of different ultrasonic frequencies enables better analysis of the state of the electrochemical storage material, in particular the fill level, with respect to the location resolution.

According to a further embodiment of the invention, it is provided that the analysis of the response signal relates to the time curve between emission signal and response signal, and/or the phase shift between emission signal and response signal, and/or the damping of the response signal in relation to the emission signal. All forms of the analysis enable a statement to be made about the curve of the acoustic wave in the wall. Various analysis methods can additionally also be combined, whereby the location resolution of the fill level height can be improved still further.

According to a further particularly advantageous embodiment of the invention, it is provided that the output of the emission signal is performed oriented in a preferred propagation direction of the emission signal. The preferred propagation direction corresponds in this case in particular to a plug, which is located on the wall and is linear in at least one direction. A direction of the emission or reception signal can be achieved by means of suitable piezoelectric actuators or sensors. Such components in particular have a directional characteristic, which enables, for example, emission signals to be emitted in a preferred direction or to be received from a preferred direction.

The invention is to be described in detail hereafter on the basis of individual figures. It is to be noted in this case that the figures are to be understood as solely schematic, and they do not enable any restriction with regard to the implementability of the invention.

In addition, it is to be noted that components having identical reference signs have an identical technical effect.

Furthermore, it is to be noted that in the present case, the individual components are claimed per se and also in any arbitrary combination with one another, wherein the combination can be capable of solving the technical problems on which the invention is based.

BRIEF DESCRIPTION OF THE DRAWINGS

In the figures:

FIG. 1 shows a first embodiment of the electrochemical storage device according to the invention in a schematic lateral sectional view;

FIG. 2 shows a further embodiment of the electrochemical storage device according to the invention in a schematic lateral sectional view;

DETAILED DESCRIPTION OF INVENTION

Figure 3:
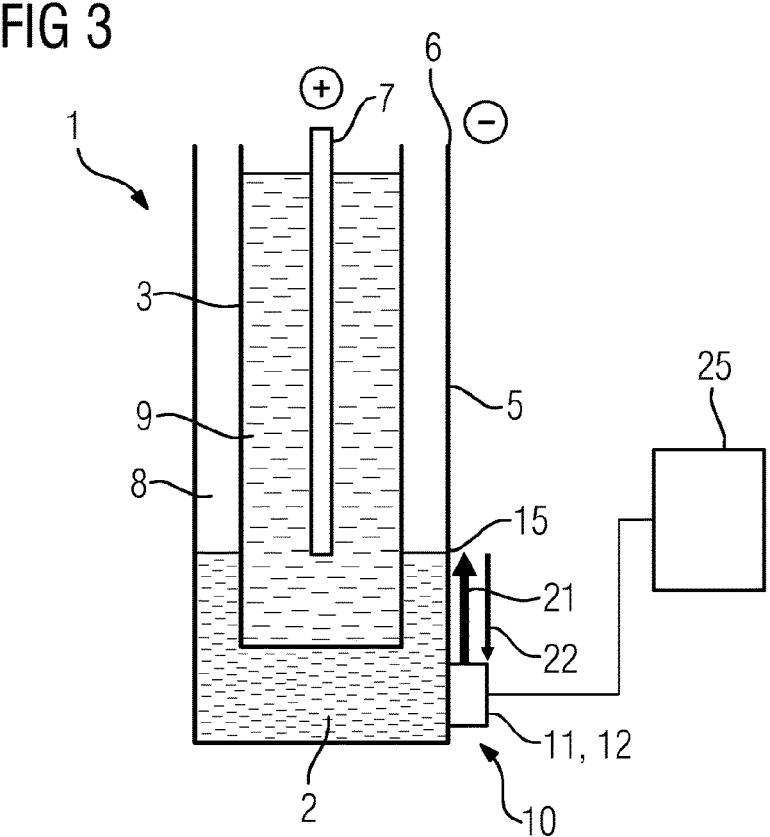
FIG. 3 shows a further embodiment of the electrochemical storage device according to the invention in a schematic lateral sectional view.

FIG. 1 shows a schematic lateral sectional view through an embodiment of an electrochemical storage device 1, which has a state detector 10. The electrochemical storage device 1 has a wall 5, which at least partially encloses an electrochemical storage material 2, wherein the electrochemical storage device 1 is embodied as a sodium-nickel chloride cell, for example. According to such an embodiment, the electrochemical storage material 2 is formed as liquid sodium at the operating temperatures of this storage device 1. The wall 5 would typically be a container made of a nickel-based alloy or steel plate or of a steel alloy plate. The electrochemical storage device 1 also comprises, in addition to the wall 5 formed as the anode 6, a cathode 7, which is arranged in a cathode chamber 9, which is not provided with further reference signs. This cathode chamber 9 is separated from the electrochemical storage material 2, which is located in an anode chamber 8, which is also not provided with reference signs, by an electrolytic separating layer 3. In the case of the embodiment of the electrochemical storage device 1 as a sodium-nickel chloride cell, this electrolytic separating layer 3 would be formed as an ion-conductive ceramic layer (solid-state electrolyte).

Furthermore, the electrochemical storage device 1 has, on the side of the wall 5 facing away from the electrochemical storage material 2, a state detector 10, which comprises an ultrasound emitter 11 and also an ultrasound receiver 12. Both components 11, 12 are attached to the wall of the electrochemical storage device 1, wherein according to the embodiment, both components 11, 12 are connectable via a plug, which is located on the wall and is linear in at least one direction. An acoustic coupling exists between the ultrasound emitter 11 and the ultrasound receiver 12 and the wall 5, so that suitable acoustic emission signals can be coupled into the wall 5 using the ultrasound emitter 11 and can be received as a response signal by means of the ultrasound receiver 12. Both ultrasound emitter 11 and also ultrasound receiver 12 are connected via an analysis circuit 25, which enables an analysis of the response signal and therefore an ascertainment of the state of the electrochemical storage material, in particular the fill level of the electrochemical storage material 2 in the anode chamber 8.

The ultrasound emitter 11 of the state detector 10 functionally couples an acoustic emission signal 21 into the wall 5. This emission signal 21, which is typically formed as acoustic waves (structure-borne noise and surface waves), propagates in the direction of the ultrasound receiver 12. On its way to the ultrasound receiver 12, however, influencing of the acoustic wave propagation takes place, since the ambient medium of the wall 5 changes over the propagation path. Thus, in particular at the interface of the electrochemical storage material 2, which is provided in particular in liquid form, the formation of a transition region 15 is achieved, which results in damping of the emission signal 21 or reflection or diffraction of the emission signal 21. Correspondingly, an acoustic emission signal 21, which is correspondingly damped, delayed, or altered with respect to its phase behavior, is received by the ultrasound receiver 12 as the response signal 22. An inference about the precise location of the transition region 15 can therefore be drawn upon comparison of the physical parameters of the two signals 21 and 22. For example, if the state detector 10 is calibrated correspondingly, the position of the transition region 15 may be converted into an interface position (fill level height) of the electrochemical storage material 2.

Since the electrochemical storage device 1 is typically operated at a temperature which is significantly greater than the ambient temperature, thermal expansions of individual materials of the components occur. These expansions can sometimes be used to determine the operating temperature, for example, if suitable calibration is provided. Thus, for example, using a suitable reference point (for example, the transition between side wall and bottom surface), an expansion can also be calculated by means of the analysis circuit 25. This expansion may in turn be associated with a predefined temperature by means of a suitable calibration standard, whereby a temperature measurement can be enabled.

FIG. 2 shows a further embodiment of the electrochemical storage device 1 according to the invention in a lateral sectional view, which differs from the embodiment shown in FIG. 1 in that the ultrasound emitter 11 and the ultrasound receiver 12 of the state detector 10 are unified in one component. According to the embodiment, it is provided that the state detector is attached at a first location of the wall 5, the corresponding region of which on the opposite side of the wall 5 is still located above the fill level of the electrochemical storage material 2 or above the fill level height. If an acoustic emission signal 21 is now emitted by means of the ultrasound emitter 11, it is again damped, scattered, and/or reflected in the transition region 15 of the wall 5. A reflected component of this emission signal 21 is detected as a response signal 22 by the ultrasound receiver 12. On the basis of the items of information thus detected from emission signal 21 and response signal 22, the interface region (transition region 15) and therefore the fill level of the electrochemical storage material 2 can again be determined by means of the analysis circuit 25. In this case, the state detector 10 can be designed, for example, as a piezoelectric module, which can operate in rapid chronologically successive steps as the ultrasound emitter 11 and then as the ultrasound receiver 12. Such components additionally enable a detection of an oriented wave, which enables targeted spatial resolution.

FIG. 3 in turn shows a lateral sectional view in schematic form through a further embodiment of the electrochemical storage device 1 according to the invention, in which the state detector 10 comprises both ultrasound emitter 11 and also ultrasound receiver 12 as an integrated component, similarly to the embodiment according to FIG. 2. The component is again electrically interconnected with an analysis circuit 25. In contrast to the embodiment shown in FIG. 2, however, the state detector 10 is attached at a second location of the wall, the corresponding region of which on the opposite side of the wall is still below the fill level or still located below the fill level height. The fill level approximately corresponds in this case to a complete discharge during normal operation. Thus, for example, the state detector 10 can be attached close to the edge of the bottom region.

Figure 4:
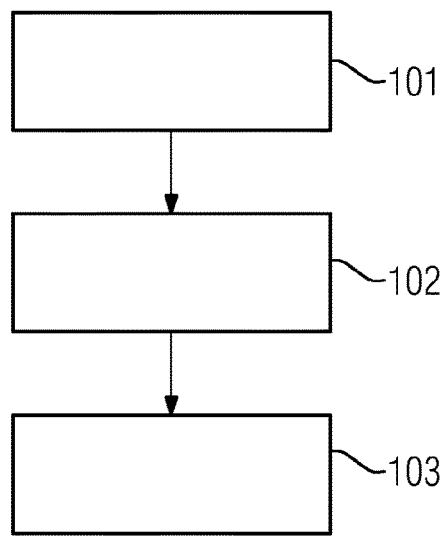
FIG. 4 shows a flow chart illustration of an embodiment of the method according to the invention for operating such an electrochemical storage device.

FIG. 4 shows a flow chart embodiment of the method according to the invention for operating an above-described electrochemical storage device, which comprises the following steps:—output of an emission signal 21 by the ultrasound emitter 11 (first method step 101);—reception of a response signal 22 by the ultrasound receiver 12 (second method step 102);—analysis of the response signal using an analysis circuit 25 to ascertain a state of the electrochemical storage material 2, in particular the fill level of the electrochemical storage material 2 (third method step 103).

Further embodiments result from the dependent claims.

The invention claimed is:

1. An electrochemical storage device having a state detector, comprising
    an electrochemical storage device, which has a wall enclosing an electrochemical storage material, wherein the state detector has at least one ultrasound emitter and at least one ultrasound receiver, which are attached on an exterior side of the wall, and wherein the electrochemical storage material is subject to a volume change during operation of the storage device,
    wherein the electrochemical storage material is provided in a liquid form and is in direct contact with the wall during operation of the storage device, and the ultrasound emitter and the ultrasound receiver are attached on the wall such that they are acoustically coupled to the wall, wherein the ultrasound emitter is configured to output an emission signal in a direction extending along the side of the wall, wherein the direction is either towards a top or a bottom of the electrochemical storage device, wherein the ultrasound receiver is configured to receive a response signal and wherein the state detector further includes an analysis circuit configured to analyze the response signal to ascertain a state of the electrochemical storage material.

2. The electrochemical storage device as claimed in claim 1, wherein the electrochemical storage material is a metal.

3. The electrochemical storage device as claimed in claim 2, wherein a melting point of the metal is not greater than 150° C.

4. The electrochemical storage device as claimed in claim 1, wherein the wall is a metal.

5. The electrochemical storage device as claimed in claim 4, wherein the wall is a metal alloy, and wherein a melting point of the metal alloy is greater than 800° C.

6. The electrochemical storage device as claimed in claim 1, wherein, during operation of the storage device, the volume change of the electrochemical storage material in a case of complete charge of the storage device defines a first fill level, and the ultrasound emitter or the ultrasound receiver is attached at a first location of the wall, wherein the first location of the wall is located above the first fill level.

7. The electrochemical storage device as claimed in claim 1, wherein, during operation of the storage device, the volume change of the electrochemical storage material in a case of complete operational discharge of the storage device defines a second fill level, and the ultrasound emitter or the ultrasound receiver is attached at a second location of the wall, wherein the second location of the wall is located below the second fill level.

8. The electrochemical storage device as claimed in claim 1, wherein the ultrasound emitter and the ultrasound receiver are unified in one component.

9. The electrochemical storage device as claimed in claim 1, wherein the state detector is designed to be operated in chirp operation.

10. The electrochemical storage device as claimed in claim 1, wherein at least one of the ultrasound emitter and the ultrasound receiver is designed as a piezoelectric component.

11. The electrochemical storage device as claimed in claim 1, wherein the electrochemical storage device is designed as a metal-metal halogenide storage device.

12. The electrochemical storage device as claimed in claim 1, wherein the direction is in a direction towards the ultrasound receiver attached on the side of the wall.

13. The electrochemical storage device as claimed in claim 1, wherein the ultrasound emitter and the ultrasound receiver are unified in one component.

14. A method for operating an electrochemical storage device as claimed in claim 1, the method comprising: output of the emission signal by the ultrasound emitter; reception of the response signal by the ultrasound receiver; analysis of the response signal using the analysis circuit to ascertain the state of the electrochemical storage material in the liquid form.

15. The method as claimed in claim 14, wherein the emission signal has a plurality of different ultrasonic frequencies.

16. The method as claimed in claim 15, wherein the emission signal is designed as a ramp over a predetermined frequency range.

17. The method as claimed in claim 14, wherein the analysis of the response signal relates to at least one of a time curve between the emission signal and the response signal, a phase shift between the emission signal and the response signal, and a damping of the response signal in relation to the emission signal.

18. The method as claimed in claim 14, wherein the state of the electrochemical storage material is the fill level of the electrochemical storage material.

19. An electrochemical storage device having a state detector, comprising:
an electrochemical storage device, which has a wall enclosing an electrochemical storage material, wherein the state detector has at least one ultrasound emitter and at least one ultrasound receiver, which are attached on an exterior side of the wall, and wherein the electrochemical storage material is subject to a volume change during operation of the storage device,
wherein the electrochemical storage material is provided in a liquid form and is in direct contact with the wall during operation of the storage device, and the ultrasound emitter and the ultrasound receiver are attached on the wall such that they are acoustically coupled to the wall,
wherein the ultrasound emitter is configured to output an emission signal in a direction along the side of the wall, wherein the direction is either towards a top or a bottom of the electrochemical storage device, wherein the ultrasound receiver is configured to receive a response signal and wherein the state detector further includes an analysis circuit configured to analyze the response signal to ascertain a fill level electrochemical storage material in the storage device;
and wherein the analysis circuit is configured to analyze a first response signal to ascertain a first fill level of the electrochemical storage material and wherein the analysis circuit is further configured to analyze a second response signal different than the first response signal to ascertain a second fill level different than the first fill level of the electrochemical storage material.

20. The electrochemical storage device as claimed in claim 19,
wherein, during operation of the storage device, the volume change of the electrochemical storage material in a case of complete charge of the storage device defines the first fill level, and
wherein, during operation of the storage device, the volume change of the electrochemical storage material in a case of complete operational discharge of the storage device defines the second fill level.

* * * * *